United States Patent
McCormack

(10) Patent No.: US 6,224,142 B1
(45) Date of Patent: May 1, 2001

(54) DOUBLE SKIN SLAT CONSTRUCTION FOR TRAILERS

(75) Inventor: Robert B. McCormack, Duncan, OK (US)

(73) Assignee: Sooner Trailer Manufacturing Co., Duncan, OK (US)

( * ) Notice: Subject to any disclaimer, the term of this patent is extended or adjusted under 35 U.S.C. 154(b) by 0 days.

(21) Appl. No.: 09/586,694

(22) Filed: Jun. 1, 2000

Related U.S. Application Data

(62) Division of application No. 09/224,758, filed on Jan. 4, 1999.

(51) Int. Cl.$^7$ ........................................................ B60J 7/00
(52) U.S. Cl. ........................... 296/191; 296/181; 296/183; 52/586
(58) Field of Search .................................. 296/191, 181, 296/183, 901

(56) References Cited

U.S. PATENT DOCUMENTS

| | | |
|---|---|---|
| D. 216,480 | 1/1970 | Wilson . |
| D. 244,382 | 5/1977 | Scheid . |
| D. 306,079 | 2/1990 | Whitney . |
| 1,913,342 | 6/1933 | Schaffert . |
| 2,476,451 | 7/1949 | Murphy et al. . |
| 2,585,976 | 2/1952 | Teeter . |
| 2,746,789 | 5/1956 | Ridgway . |
| 2,753,018 | 7/1956 | Curell . |
| 2,993,728 | 7/1961 | Beran et al. . |
| 3,043,407 | 7/1962 | Marryatt . |
| 3,097,877 | 7/1963 | Erlandsen . |
| 3,100,556 | 8/1963 | Ridder . |
| 3,116,950 | 1/1964 | Chieger et al. . |
| 3,269,072 | 8/1966 | Black . |
| 3,380,216 | 4/1968 | Spence . |
| 3,555,762 | 1/1971 | Costanzo, Jr. . |
| 3,556,583 | 1/1971 | Ellard . |
| 3,886,705 | 6/1975 | Cornland . |
| 4,670,324 | 6/1987 | Sato et al. . |
| 4,758,128 | 7/1988 | Law . |
| 4,951,992 | 8/1990 | Hickney . |
| 5,052,741 | 10/1991 | Brown et al. . |

(List continued on next page.)

FOREIGN PATENT DOCUMENTS

| | | |
|---|---|---|
| 2097340 | 6/1997 | (CA) . |
| 392284 | 9/1965 | (CH) . |
| 1068570 | 8/1956 | (DE) . |
| 1680618 | 3/1970 | (DE) . |
| 2918582 | 11/1980 | (DE) . |
| 2510061 | 7/1982 | (FR) . |
| 2504236 | 10/1982 | (FR) . |
| 1497184 | 10/1996 | (FR) . |
| 1171253 | 11/1969 | (GB) . |
| 2158931 | 11/1985 | (GB) . |
| 63-159449 | 7/1988 | (JP) . |

OTHER PUBLICATIONS

Commercial Car Journal, Feb. 1960, p. 136.

*Primary Examiner*—Joseph D. Pape
*Assistant Examiner*—Kiran B. Patel
(74) *Attorney, Agent, or Firm*—Hovey, Williams, Timmons & Collins

(57) ABSTRACT

An improved slat construction (20) for use in a livestock trailer (22) includes a double skin slat (24) connected to upright posts (38) of the trailer (22) with weld connections (68). The slat (24) includes an inner skin (26), an outer skin (28), a plurality of bulkheads (30), and female and male edge connections (32, 34). The inner and outer skins (26, 28) are spaced apart to define a gap (62) therebetween, and the bulkheads (30) are positioned in the gap (62) and connect to the inner and outer skins (26, 28) to divide the gap (62) into internal chambers which inhibit heat transfer by convection. The female connection (32) includes opposed legs (78) defining a groove (80) therebetween, and the male connection (34) includes a tongue (74) inserted into the groove (80) to connect adjacent slats (24).

10 Claims, 2 Drawing Sheets

U.S. PATENT DOCUMENTS

| | | |
|---|---|---|
| 5,112,099 | 5/1992 | Yurgevich et al. . |
| 5,131,710 | 7/1992 | Kamiguchi et al. . |
| 5,140,913 | 8/1992 | Takeichi et al. . |
| 5,403,062 | 4/1995 | Sjostedt et al. . |
| 5,613,726 | 3/1997 | Hobbs et al. . |
| 5,702,151 | 12/1997 | Grote et al. . |
| 5,791,726 | 8/1998 | Kaufman . |

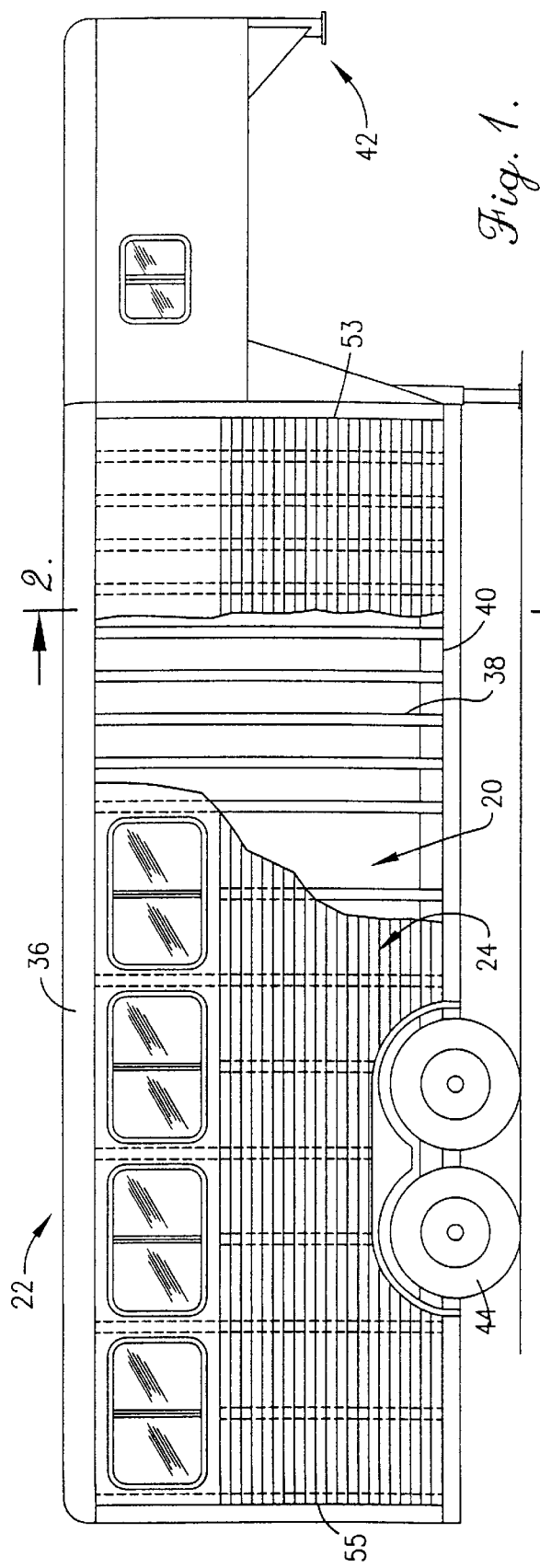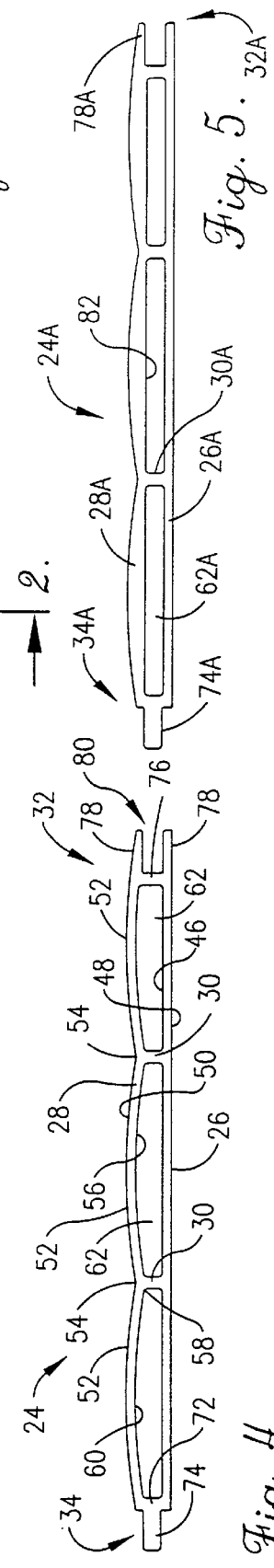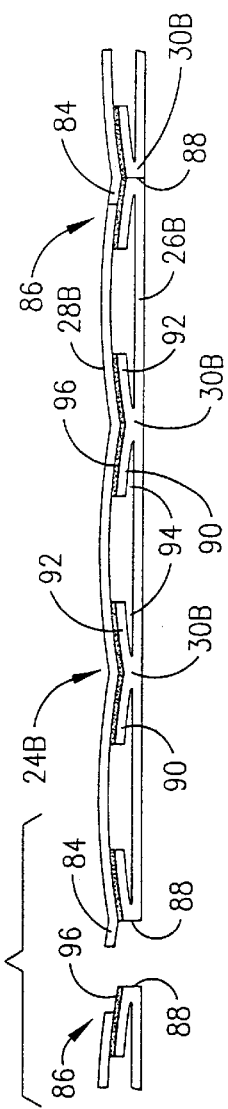

DOUBLE SKIN SLAT CONSTRUCTION FOR TRAILERS

CROSS-REFERENCE TO RELATED APPLICATION

This application is a divisional of prior co-pending application Ser. No. 09/224,758 filed Jan. 4, 1999.

TECHNICAL FIELD

This invention relates to trailer structures and, more particularly, to livestock trailer sidewall slat constructions.

BACKGROUND

Horses, cattle, and other livestock are commonly transported from one location to another in specially constructed trailers which include sidewalls, roofs, floor decking structures, and loading gates or doors. The dimensions and features of these trailers vary widely depending on the type of livestock to be transported and the specific end uses for which the trailers are designed. For example, horse trailers range from single horse, standard hitch trailers, to multi-horse, goose-neck trailers that include living quarters for equestrians.

The sidewall structures of many livestock trailers are formed with panels supported by and welded to posts emending upwardly from the floor decking structures. However, difficulties have been encountered with even the most advanced sidewall panel constructions. The sidewalls are commonly assembled by welding a plurality of panels to upright posts. Frequently, water seeps into the trailer at the connections between adjacent panels, and heat generated while welding heats the panels to the extent that their exterior surfaces are discolored by oxidation. Additionally, the panels are preferably made from aluminum making it difficult to insulate the trailers.

Another problem is encountered with reliability of the welds between the panels and the upright posts. If an insufficient amount of material is provided by the panels for the weld connection, the attachment material can melt away or insufficient penetration is made into the attachment material while trying to keep from melting the attachment material away. Further, the livestock being transported in the trailers will kick the sidewalls. Unfortunately, the animals are strong enough to dent the panels and occasionally break the weld connections between the panels and the upright posts. To inhibit damage from kicking, kick plates are sometimes attached to the inner side of the sidewalls. However, their attachment is undesirably difficult because of the preferred non-planar configuration of the panel walls.

SUMMARY OF THE INVENTION

Accordingly, one important object of the present invention is to provide an improved sidewall construction which inhibits discoloration, has more reliable welds, is better insulated, and to which kicking plates and other such devices are more easily attached.

In carrying out the foregoing and other objects, the present invention contemplates an improved sidewall slat for use in a trailer. The slat includes an outer skin and an inner skin which is spaced apart from the outer skin to define an internal gap therebetween. A reinforcing bulkhead is positioned in the gap and connects the inner skin and the outer skin.

In a preferred embodiment, a plurality of bulkheads divide the gap into a plurality of internal chambers which are operative to inhibit convection between the inner and outer skins, and the gap is filled with an insulating material. A weld location line is formed in an exposed surface of the inner skin, and the inner skin is substantially flat having substantially planar surfaces. The outer skin is preferably scalloped having alternating peaks and valleys on both its exterior and interior surfaces. Alternatively, the interior surface of the outer skin is substantially planar. The inner and outer skins and the bulkhead are preferably integrally formed, but in an alternate embodiment, the inner and outer skins are formed by separate components which are adhered together. In this alternate embodiment, the bulkheads comprise generally V-shaped bulkheads which receive the peaks of the interior surface of the outer skin.

The present invention further contemplates incorporating the foregoing slat construction into a trailer for transporting livestock. The trailer includes a trailer frame with a plurality of upright posts extending upwardly from a floor of the trailer. A plurality of sidewall slats as described above are attached to the upright posts by weld connections. Preferably, the weld connections are centrally positioned between the bulkheads at the weld location lines.

In a preferred embodiment of the trailer, at least one of the sidewall slats includes an edge having an elongated tongue, and an adjacent sidewall slat includes an edge having opposed legs defining a groove which receives the tongue therein. The height of the tongue and the height of the legs are preferably greater than the width of the groove between the legs to inhibit the penetration of water through the sidewall of the trailer.

BRIEF DESCRIPTION OF THE DRAWINGS

FIG. 1 is a side elevational view of a trailer incorporating an improved slat construction according to the present invention;

FIG. 4 is an end view of a wall slat used in the slat construction of FIG. 1;

FIG. 5 is an end view of an alternate wall slat; and

FIG. 6 is a partially exploded end view of another alternate wall slat.

DETAILED DESCRIPTION

Figures 2, 3:
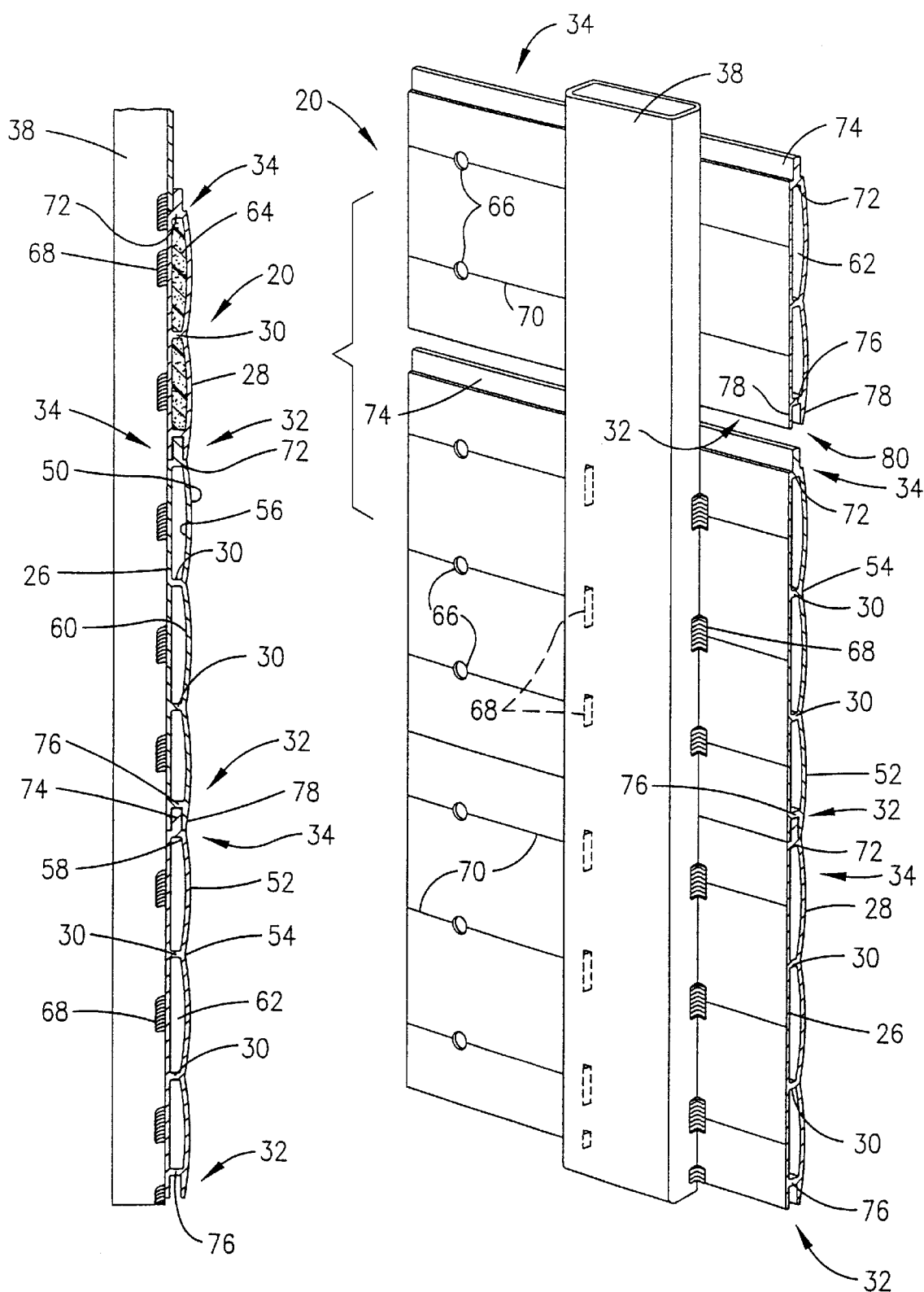
FIG. 2 is a fragmentary, vertical sectional view of the slat construction of FIG. 1 taken along line 2—2 in FIG. 1.
FIG. 3 is a fragmentary, perspective, partially exploded, vertical sectional view of the slat construction of FIG. 1 from inside the trailer.

Referring to the drawings in greater detail, the improved slat construction 20 shown in FIGS. 1–3 is utilized in a livestock or horse trailer 22. The improved slat construction 20 includes a plurality of extruded aluminum slats 24 each having an inner skin 26, an outer skin 28, a plural of bulkheads 30, a normally upper longitudinal edge 34, and a normally lower longitudinal edge 32. The trailer 22 includes a roof 36 and a trailer frame which includes a plurality of upright posts 38 extending upwardly from a floor structure 40 toward the roof 36. The trailer 22 also includes many conventional features such as a hitching mechanism 42 and a plurality of ground-engaging wheels 44. The wheels 44 are rotatably mounted on and support the trailer frame, and the hitching mechanism 42 is connected to the front of the trailer frame for coupling the trailer 22 with a towing vehicle (not shown). These conventional features and others of the trailer 22 are described to the extent necessary for an understanding of the invention.

Referring to FIGS. 2–4, the inner skin 26 is substantially flat and includes a substantially planar enclosed surface 46 which faces the outer skin 28 and an exposed surface 48 which faces away from the outer skin 28. The outer skin 28 is preferably scalloped and includes an exterior surface 50 having alternating peaks 52 and valleys 54. The outer skin 28 also includes an interior surface 56 facing toward the inner skin 26. The interior surface 56 is also preferably scalloped having alternating peaks 58 and valleys 60. The peaks 50 of the exterior surface coincide with the valleys 60 of the interior surface 56, and the valleys 54 of the exterior surface 50 coincide with the peaks 58 of the interior surface 56. The inner skin 26 is spaced apart from the outer skin 28 to define an insulating gap 62 between the inner and outer skins.

The horizontal bulkheads 30 of each slat 24 are positioned in the gap 62 at vertically spaced uniform intervals. Each bulkhead 30 preferably extends the full length of the slat and is of such a width that it spans the distance between the inner and outer skins to divide the gap into a plurality of elongated internal chambers, thereby interrupting the otherwise open expanse of the gap 62 from one edge 32 to the other edge 34 and thereby impeding airflow between the edges. This inhibits heat transfer by convection between the inner and outer skins. The bulkheads, which are connected to the inner and outer skins, are preferably positioned at the valleys 54 of the exterior surface 50 of the outer skin 28 to reinforce the outer wall. Thus, a structurally sound arch is formed between the bulkheads 30 thereby inhibiting the formation of dents in the exterior surface 50 of the outer skin 28.

As shown in the embodiment of FIG. 4, the inner and outer skis and bulkheads are preferably integrally formed. Further, each slat preferably includes two bulkheads bifurcating the gap into three internal cavities. The outer skin 28 preferably includes three scallops, so that there are three peaks 52 on the exterior surface 50 of the outer skin 28 and two valleys 54 separating the peaks 52. The slat is elongated having a forward end 53 (FIG. 1) and a rearward end 55 (FIG. 1), and the skins and bulkheads are also elongated preferably extending over the entire length of the slat.

To further insulate the slat, the gap 62 is alternatively filled with an insulating material 64. The insulating material is introduced into the internal air chambers of the gap 62 through insulation fill holes 66 (FIG. 3) formed through the inner skin 26. With the exception of the alternate insulation fill holes 66, the inner skin is substantially continuous.

Because the inner skin is substantially continuous, weld connections 68, which connect the slat 24 to the upright posts 38, can be used anywhere along the length of the upright posts. Alternatively, the slats can be attached to the posts with an adhesive or mechanical fasteners. Further, the substantially continuous inner skin 26 also provides sufficient attachment material, so that the weld connections 68 are consistently formed with adequate weld penetration into the inner skin and without structural damage to the slat 24. The substantially continuous inner skin also allows for the simple attachment of devices such as kick plates (not shown) which inhibit livestock from denting the slats.

Though the weld connection 68 can be made at any point along the lengths of the upright posts, the weld connections 68 are preferably formed at locations away from the bulkheads 30. As shown in the preferred embodiment, the weld connections 68 are centrally positioned between the bulkheads 30. To substantially guarantee the location of the weld connections 68 between the bulkheads 30, the slat 24 is formed with a weld location line 70 positioned centrally between the bulkheads 30. The weld locations line 70 is formed by a narrow and shallow groove extruded in the slat and preferably extends over the entire length of the slat 24 parallel to the bulkheads. With the weld connections 68 located between the bulkheads 30, there is little, if any, discoloration on the exterior surface 50 of the outer skin 28. The heat generated by welding is spread throughout the inner skin which acts as a heat sink. Further, there is a large surface area from which heat is discharged. Further, because the welds are spaced apart from the bulkheads, the heat must travel through both the inner skin and bulkhead before it reaches the exterior surface of the outer skin thereby inhibiting the conduction of heat to the outer skin. Thus, insufficient heat is transferred to the outer skin to cause discoloration even though the gap is substantially closed and air cannot escape from between the inner and outer skins.

The opposed first and second edges 32, 34 preferably comprise a female edge connection and a male edge connection, respectively, to connect adjacent slats. The male edge connection 34 comprises a first end wall 72 and an elongated tongue 74. The female edge connection 32 comprises a second end wall 76 and a pair of elongated opposed legs 78 defining a groove 80 therebetween. The end walls 72, 76 are adjacent to the edges and extend over the length of the slat between and connect to the inner and outer skins 26, 28 to close the internal gap 62 at the edges of the slat. The tongue 74 is matingly inserted into the groove 80 of an adjacent slat. To provide continuity between the surfaces 46, 48, 50, 56 of the slats, the tongue 74 and legs 78 preferably extend over the length of the slat and have approximately the same heights. To inhibit water from seeping into the trailer 22 along the edges of the adjacent slats, the heights of the tongue 74 and legs 78 are preferably greater than the width of groove 80 between the legs 78.

Referring to the alternate embodiment shown in FIG. 5, the alternate embodiment is, in many ways, similar to the previously described embodiment and similar elements will be identified with similar reference numerals distinguished by the suffix A. The alternate slat 24A also includes an inner skin 26A, an outer skin 28A, and a plurality of bulkheads 30A which are preferably integrally formed. In this embodiment the outer skin 28A is further strengthened by adding material to its interior surface 82.

Preferably, the interior surface 82 is substantially planar, so that the outer skin has a thickness which gradually increases as the distance from the bulkheads increases. Thus, the embodiment of FIG. 5 provides increased resistance to the formation of dents in the outer skin 28A at the locations between the reinforcing bulkheads 30A.

Referring to the alternate embodiment shown in FIG. 6, the alternate embodiment is, in many ways, similar to the previously described embodiment and similar elements will be identified with similar reference numerals distinguished by the suffix "B". The alternate slat 24B also includes an inner skin 26B, an outer skin 28B, and a plurality of bulkheads 30B. However, the inner skin 26B is separately extruded from the outer skin 28B, and the bulkheads 30B are integrally formed with a selected one of the inner and outer skins. As shown in FIG. 6, it is preferred that the bulkheads are integral with the inner skin.

The outer skin 28B is scalloped and includes an overlapping tab 84 along one edge. The opposite edge 86 from the overlapping tab 84 has a portion thereof removed, so that the removed portion of one slat 24B is configured to mate with an overlapping tab from an outer skin of an adjacent slat. The inner skin includes abutment edges 88 which abut each other when the slats are welded to the upright posts 38. As illustrated, the overlapping tabs 84 overlap the inner skins 26B adjacent to the abutment edges 88.

The bulkheads 30B are generally V-shaped to present a pair of diverging legs 90, 92. The shallow V-shape of each bulkhead 30B enables it to complementally mate with the peaks 58B of the interior surface 56B of the outer skin 28B. The legs 90, 92 of the bulkheads 30B are spaced away from the inner skin 26B by narrow converging gaps 94. An adhesive 96 is applied between the V-shaped bulkheads and the peaks 58B to bond the inner and outer skins together.

Thus, an improved slat construction is provided which inhibits discoloration during welding, increases the reliability of weld connections, provides additional insulating capacity, inhibits the formation of dents in the slats, and inhibits water from seeping into the trailer between the adjacent slats.

Although preferred forms of the invention have been described above, it is to be recognized that such disclosure is by way of illustration only, and should not be utilized in a limiting sense in interpreting the scope of the present invention. Modifications to the exemplary embodiments, as herein above set forth, could be readily made by those skilled in the art without departing from the spirit of the appended claims.

The inventor(s) hereby state their intent to rely on the Doctrine of Equivalents to determine and assess the reasonably fair scope of their invention as pertains to any apparatus or method not materially departing from but outside the literal scope of the invention as set out in the following claims.

I claim:

1. An elongated, integrally formed, extruded metal sidewall slat for use in a trailer, the slat comprising:
    an outer skin having an exterior surface and an interior surface;
    a substantially continuous inner skin spaced apart from the outer skin to define an internal insulating gap, and the inner skin having an enclosed surface and an exposed surface;
    a longitudinally extending first edge;
    a longitudinally extending second edge opposite the first edge; and
    at least one reinforcing bulkhead positioned in the gap between the first and second edges, and the bulkhead being connected to the inner skin and the outer skin to divide the gap into a plurality of internal chambers thereby inhibiting convection between the inner skin and the outer skin,
    said exposed surface of the inner skin being flat,
    said outer skin having, in transverse cross-section, at least a pair of smoothly arcuate, side-by-side, outwardly convex arches integrally joined together at a valley between the two arches to render said exterior surface smoothly convexly scalloped,
    said at least one bulkhead being aligned with and located at said valley.

2. The slat according to claim 1 further comprising an insulating material substantially filling the gap.

3. The slat according to claim 1,
    said outer skin having three outwardly convex arches and a pair of laterally spaced valleys,
    said arches being integrally joined together at said valleys,
    there being a pair of bulkheads within the gap between the inner and outer skins,
    said bulkheads being aligned with and located at said valleys.

4. The slat according to claim 3 further comprising a first end wall connected to the inner skin and the outer skin adjacent the first edge, and a second end wall connected to the inner skin and the outer skin adjacent the second edge.

5. The slat according to claim 1 further comprising a weld location line formed in the exposed surface of the inner skin.

6. An elongated, integrally formed, extruded metal sidewall slat for trailers comprising:
    an outer skin having an exterior surface and an interior surface;
    a substantially continuous inner skin spaced apart from the outer skin to define an internal insulating gap,
    the inner skin having an enclosed surface and an exposed surface;
    a longitudinally extending first edge:
    a longitudinally extending second edge opposite the first edge;
    at least one reinforcing bulkhead positioned in the gap between the first and second edges,
    said bulkhead being connected to the inner skin and the outer skin to divide the gap into a plurality of internal chambers thereby inhibiting convection between the inner skin and the outer skin,
    said exposed surface of the inner skin being flat; and
    a longitudinally extending weld location line on said exposed surface of the inner skin extending parallel to said first and second edges.

7. A sidewall slat as claimed in claim 6,
    said weld location line comprising a groove in said exposed surface of the inner skin.

8. A sidewall slat as claimed in claim 6,
    said weld location line being spaced away from said bulkhead.

9. A sidewall slat as claimed in claim 8,
    there being a least a pair of said bulkheads at spaced locations within the gap,
    said weld location line being centrally disposed between said bulkheads.

10. A sidewall slat as claimed in claim 9,
    said weld location line comprising a groove in said exposed surface of the inner skin.

* * * * *